United States Patent
Večeřa et al.

(10) Patent No.: US 9,715,589 B2
(45) Date of Patent: Jul. 25, 2017

(54) OPERATING SYSTEM CONSISTENCY AND MALWARE PROTECTION

(71) Applicant: Red Hat, Inc., Raleigh, NC (US)

(72) Inventors: Martin Večeřa, Brno (CZ); Lenka Vaskova, Geca (SK)

(73) Assignee: RED HAT, INC., Raleigh, NC (US)

( * ) Notice: Subject to any disclaimer, the term of this patent is extended or adjusted under 35 U.S.C. 154(b) by 77 days.

(21) Appl. No.: 14/604,023

(22) Filed: Jan. 23, 2015

(65) Prior Publication Data

US 2016/0217282 A1   Jul. 28, 2016

(51) Int. Cl.
- *G06F 21/56*   (2013.01)
- *G06F 21/50*   (2013.01)
- *G06F 21/55*   (2013.01)

(52) U.S. Cl.
CPC ............ *G06F 21/565* (2013.01); *G06F 21/50* (2013.01); *G06F 21/55* (2013.01); *G06F 21/56* (2013.01); *G06F 21/554* (2013.01); *G06F 21/566* (2013.01); *G06F 21/567* (2013.01)

(58) Field of Classification Search
CPC ........ G06F 21/50; G06F 21/55; G06F 21/554; G06F 21/56; G06F 21/565; G06F 21/566; G06F 21/567
See application file for complete search history.

(56) References Cited

U.S. PATENT DOCUMENTS

| | | | |
|---|---|---|---|
| 7,478,431 B1 | 1/2009 | Nachenberg | |
| 7,627,898 B2 | 12/2009 | Beck et al. | |
| 8,312,545 B2 | 11/2012 | Tuvell et al. | |
| 8,726,388 B2 | 5/2014 | Turbin | |
| 8,745,743 B2 | 6/2014 | Turbin et al. | |
| 8,769,685 B1 * | 7/2014 | Conrad | G06F 21/562 726/23 |
| 8,910,144 B1 * | 12/2014 | Joyce | G06F 9/45504 717/174 |
| 2007/0214503 A1 * | 9/2007 | Shulman | G06F 11/2257 726/22 |
| 2008/0222603 A1 * | 9/2008 | Shaw | G06F 9/45512 717/120 |
| 2011/0047597 A1 * | 2/2011 | Mahaffey | G06F 21/564 726/3 |

(Continued)

OTHER PUBLICATIONS

Michael Robertson, A Social Approach to Security: Using Social Networks to Help Detect Malicious Web Content, 2010, Rochester Institute of Technology RIT Scholar Works, Thesis/Dissertation Collection, 121 pgs.

(Continued)

*Primary Examiner* — Kambiz Zand
*Assistant Examiner* — Ayoub Alata
(74) *Attorney, Agent, or Firm* — Haynes and Boone, LLP

(57) ABSTRACT

Methods, systems, and computer program products are included for determining the risk that a file includes malware. The risk is determined by sending identifying information of the file from a client to a server. The server matches the identifying information with identifying information stored in a registry, in order to identify the file. Once the file is identified, the server identifies the risk of malware corresponding to the file, and sends the risk information to the client. The client is able to use the risk information to make determinations regarding performing operations with regard to the file.

17 Claims, 5 Drawing Sheets

(56) References Cited

U.S. PATENT DOCUMENTS

2011/0225655 A1    9/2011   Niemela et al.
2013/0307690 A1    11/2013   Jones et al.

OTHER PUBLICATIONS

McAfee® Network Security Platform 7.5, Addendum I, Revision A, Copyright © 2013 McAfee, Inc., 204 pgs.

Acar Tamersoy, Kevin Roundy, Duen Horng Chau, Guilt by Association: Large Scale Malware Detection by Mining File-relation Graphs, College of Computing Georgia Institute of Technology; Symantec Research Labs, KDD'14, Aug. 24-27, 2014, New York, NY, USA., Copyright © 2014 ACM 978-1-4503-2956-9/14/08,10 pgs.

\* cited by examiner

OPERATING SYSTEM CONSISTENCY AND MALWARE PROTECTION

BACKGROUND

Malware is a term that refers to malicious software. Malware includes software that is designed with malicious intent to cause intentional harm. Examples of malware include viruses, worms, ransomware, spyware, adware, rootkits and so forth. In many cases, malware takes the form of executable code stored in a binary file that is unknowingly executed by a user of a computing device.

Malware causes many issues for users. For example, malware may negatively affect the resources of the computing device, invade users' privacy by stealing information, adversely affect computing devices' stability, and hijack users' computing device for illegitimate purposes. In many instances, users may not even be aware of the presence of the malware.

Programs such as anti-virus software are used to detect and remove malware. Anti-virus software may compare malware signatures to data of programs stored on the computing device. Matches between malware signatures and program data may indicate the presence of malware. The malware signatures can be stored in large databases that include thousands of malware signatures. Often, there are a large number of files that are scanned to detect the malware signatures. Programs can be scanned each time they are executed, resulting in a large number of scans. Detection of malware may therefore involve non-trivial amounts of computing device processor and/or memory resources.

BRIEF SUMMARY

According to an example, a computer-implemented method for identifying malware using a registry includes receiving a first file identification information from a first client of a plurality of clients, wherein the first file identification information corresponds to a first file and includes a received file path, a received version, and a received architecture. The method further includes querying a data store for a second file identification information that matches the first file identification information, wherein the second file identification information includes a stored path, a malware risk value, and a file counter. The method further includes detecting a degree of match by matching between the received file path and the stored file path. The method further includes incrementing the file counter. The method further includes determining a risk score based on the degree of match, the file counter, and the malware risk value. The method further includes returning the risk score to the first client.

According to an example, a non-transitory computer-readable medium for identifying malware using a directory service registry includes computer-readable instructions, the computer-readable instructions executable by a processor to cause the processor to: receive a first identification information from a client, the first identification information corresponding to a first file. The medium further includes instructions to compare the first identification information and a second identification information to determine a match, the second identification information corresponding to a second file. The medium further includes instructions to retrieve a file counter associated with the second file. The medium further includes instructions to retrieve a malware risk value associated with the second file. The medium further includes instructions to, based on the file counter and the malware risk value, determine a risk score associated with the first file. The medium further includes instructions to return the risk score to the client.

According to an example, a registry system for determining malware risk includes a client including a processor in communication with a memory, the client to: detect an operation corresponding to a first file, determine a first information associated with the first file, the first information including a first hash code, a first file path, a first version, and a first architecture. The system further includes a server communicatively coupled to the client, the server having a directory service and a registry, the directory service to: receive the first information from the client; retrieve, from the registry, a file counter corresponding to the first information; retrieve, from the registry, a malware risk value corresponding to the first information; determine a risk value corresponding to the first information based on the file counter, the malware risk value, and a matching between the first file path and a second file path; and notify the client of the risk value, prior to the client installing the first file.

BRIEF DESCRIPTION OF THE DRAWINGS

Various examples of the present disclosure will be understood more fully from the detailed description given below and from the accompanying drawings of various examples of the disclosure.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
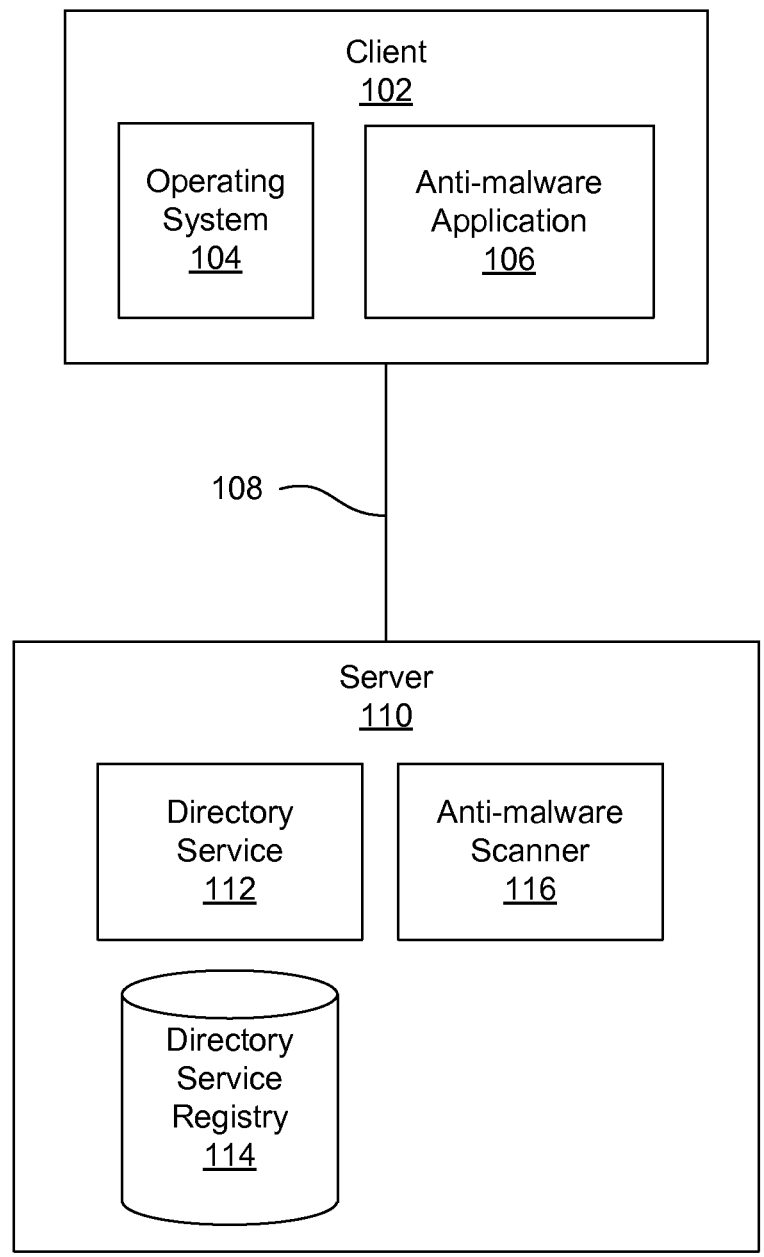
FIG. 1 is a block diagram illustrating a system architecture for malware detection, in accordance with various examples of the present disclosure.

FIG. 1 illustrates an exemplary system architecture 100 for malware detection in which examples of the present disclosure can be implemented.

System architecture 100 includes a client 102. Client 102 may be a user machine, such as a personal computer (PC), a tablet PC, a set-top box (STB), a Personal Digital Assistant (PDA), a cellular telephone or other mobile device, or any machine capable of executing a set of instructions (sequential or otherwise). Further, while one client is illustrated, the term client shall also be taken to include any collection of computing devices that individually or jointly execute a set (or multiple sets) of instructions to perform any one or more of the methodologies discussed herein. System architecture 100 may include a single client or plurality of clients.

Client 102 runs an operating system 104 that manages hardware and software of the respective user machine. In the present embodiment, the client 102 runs the operating system by booting the operating system 104 during a boot process. The operating system 104 may be any standard or proprietary operating system. The operating system is configured to install and execute one or more applications, such as anti-malware application 106. The operating system 104 may install and execute applications with or without active human interaction.

In the present embodiment, the operating system 104 is structured to run an anti-malware application 106. The anti-malware application 106 is structured to identify malware and take remedial action. In the present example, the operating system 104 runs the anti-malware application 106 during a boot process of the operating system. In other examples, the anti-malware application 106 is executed prior to booting the operating system 104, in order to detect malware in the operating system 104 itself. In other examples, the anti-malware application 106 is executed after booting the operating system, in order to perform malware analysis on each subsequently executed application.

Anti-malware application 106 is structured to determine hash codes corresponding to files. Hash codes may be determined by analyzing files using algorithms such SHA or MD5. The anti-malware application 106 may include a data store that is structured to store hash codes associated with files. The anti-malware application is structured to compare hash codes of files with one or more hash codes stored in the data store to detect matches. A hash code match may identify that the file is approved for the particular operation. For example, if the detected operation is a file execution, a match between the file's hash code and one of the stored hash codes may identify that the file is approved for execution. Inability to locate a match for a file's hash code in the data store may trigger additional actions. Additional actions may include, for example, contacting a server 110 to receive malware-related information regarding the file.

The client 102 is communicatively coupled via a connection 108 to a server 110. The connection 108 may represent any combination or physical and/or wireless connections. Each connection may be part of a network. A network may be a public network (e.g., the Internet), a private network (e.g., a local area network (LAN) or wide area network (WAN)), or a combination thereof. In an example, the network may include the Internet and/or one or more intranets, landline networks, wireless networks, and/or other appropriate types of communication networks. In an example, the network may comprise a wireless telecommunications network (e.g., cellular phone network) adapted to communicate with other communication networks, such as the Internet.

In the present example, the client 102 is structured to send and receive data associated with the anti-malware application 106 via the connection 108, in order to communicate with the server 110. The server 110 is also structured to communicate with client 102 via the connection 108.

The server 110 may represent one or more server machines that individually or jointly execute a set (or multiple sets) of instructions to perform any one or more of the methodologies discussed herein. Examples of server machines include enterprise servers, personal computers (PCs), and any machines capable of executing a set of instructions (sequential or otherwise).

In the present example, the server 110 is structured with a directory service 112, a directory service registry 114 and an anti-malware scanner 116. The directory service 112 is an application that runs on an operating system on the server 110. Directory service 112 is configured to interact with the server 110 in order to communicate with the anti-malware application 106. In the present example, the directory server 112 receives file identification information from the anti-malware application 106, such as a hash code, file path, version, and architecture information corresponding to a file stored on the client 102. In the present example, the file is configured to be executed on a particular architecture. For example, architectures may include 32-bit or 64-bit architectures, INTEL x86 or POWERPC architectures, and so forth. The architecture information for the file may be determined using an API function.

The directory service 112 is also structured to request and receive files from the anti-malware application 106. In some examples, if anti-malware application 106 is unable to match a hash code of a file with a hash code in the local data store of the client 102, then the anti-malware application 106 is configured to send the file to directory service 112 for analysis.

The directory service 112 is coupled to a directory service registry 114. In some examples, the directory service registry 114 is a database such as an SQL-compliant database. In other examples, the directory service registry 114 is another type of data store, such as a flat file or a web service. In the present example, the directory service registry 114 is stored on the server 110. In other examples, the directory service registry 114 is stored on a data storage device separate from the server.

The directory service registry 114 is structured to store file identification information pertaining to files stored on one or more clients (e.g., client 102). File identification information may include hash codes corresponding to files, a file counter that tracks a number of clients (or number of users) that have each particular file, and the malware risk value corresponding to each file. In some examples, the number of clients that "have" each particular file is the number of clients that have sent file identification information to the server and are matched to the file identification information that is stored on the server regarding that file. In some examples, the malware risk value is identified as a probability. In other examples, the malware risk value is identified by a string or a number corresponding to a risk level.

The directory service registry 112 may structure the file identification information by organizing or grouping the data according to the file to which the data corresponds. The directory service registry 114 may also store account information pertaining to each client (e.g., client 102), or to individual users of each client. In other examples, account information may be stored separately. Accordingly, directory service 112 may access account information in order to uniquely identify clients that are connecting to the server. Accordingly, the number of clients having a file may be incremented based on the number of unique clients (or users) that have contacted the server regarding the file.

In the present example, server 110 is structured with an anti-malware scanner 116. In some examples, server 110 is structured with a plurality of anti-malware scanners that together or separately scan files for malware. In the examples where the server has a plurality of anti-malware scanners, server 110 may receive files from clients (e.g., client 102) and scan the files using the one or more anti-malware scanners. The results from the anti-malware scanner may be aggregated in order to determine a malware risk value corresponding to the file. The directory service 112 is communicatively coupled to anti-malware scanner 116, such that directory service 112 receives a malware risk value determined for each file and stores the malware risk value associated with each file in the directory service registry 114.

System architecture 110 allows for information gathering and malware scanning at a server 110. The server 110 is able to take advantage of information from a plurality of clients in order to more accurately detect malware. For example, a large number of clients that have the same file installed may be indicative that the file does not have malware. Divesting of malware scanning from the client 102 and placing the scanning functionality on the server 110 results in fewer resources being used for malware scanning on the client 102. Accordingly, the client 102 may realize performance gains.

Figure 2:
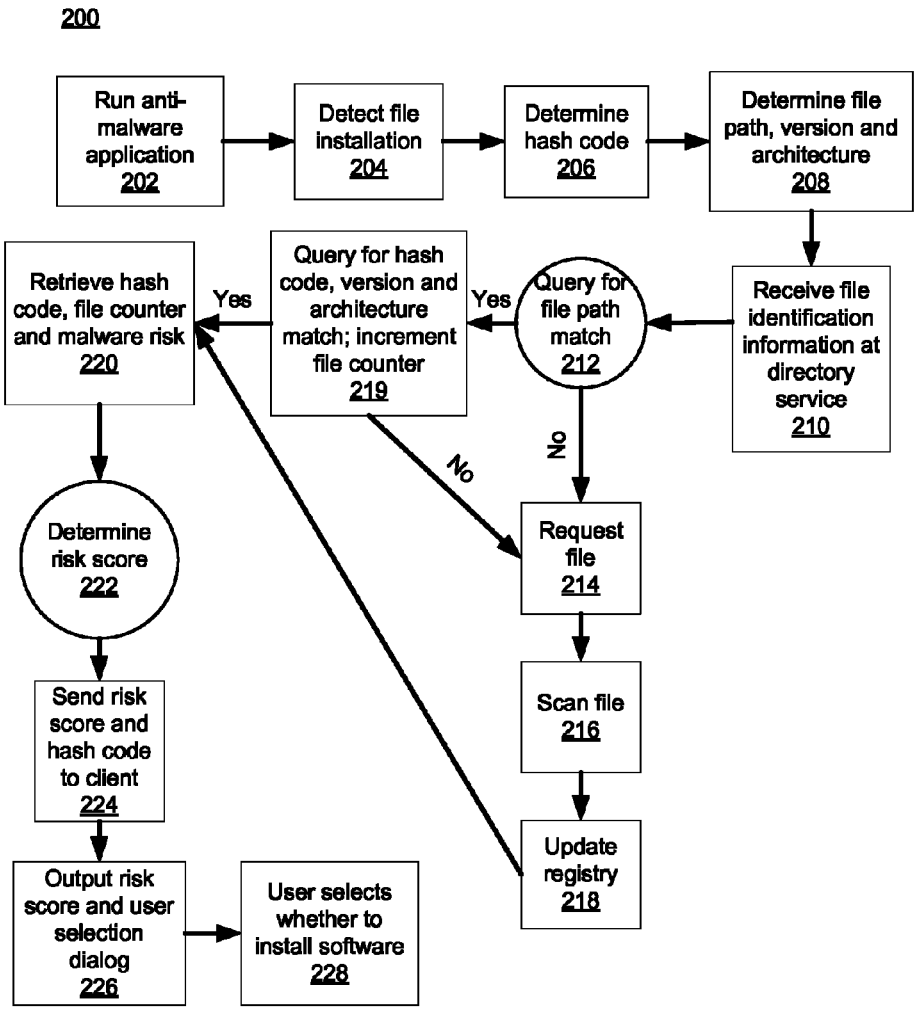
FIG. 2 is a flow diagram illustrating malware detection, according to an example of the present disclosure.

FIG. 2 is a flow diagram illustrating malware detection, according to an example of the present disclosure. The method 200 may be performed by processing logic that may comprise hardware (e.g., circuitry, dedicated logic, programmable logic and microcode), software (such as instructions run on a computer system, specialized hardware, dedicated machine, or processing device), firmware, or a combination thereof.

At block 202, an anti-malware application is executed on a client machine, such that the anti-malware application is running as a background process on the client machine. In the present example, the anti-malware application is executed during the operating system boot process in order to provide malware protection prior to running user applications. In other examples, the anti-malware application may be executed prior to or after booting the operating system. The running anti-malware application is triggered on the client based on detection of specified file activities. In the present example, the specified activities may be user-configured, and include activities such as an attempt to install and/or execute a file. In other examples, the detected activities also include an attempt to download a file.

At block 204, the client attempts to install a file. The attempt to install the file triggers the anti-malware application, prior to installing the file. Accordingly, the client is able to make a determination for whether to approve the file for installation using the following steps.

At block 206, the anti-malware application determines a hash code for the file that the client is attempting to install. For example, the anti-malware application may determine an MD5 or SHA hash code for the file. In other examples, if an installation is for a plurality of files, the anti-malware application may determine a hash code corresponding to each file in the plurality of files.

At block 208, the anti-malware application determines a file path corresponding to the file, a version for the file, and the architecture on which the file is configured to run. For example, if the installation path for the file is the "c:\program files\folderA\folderB" directory, then the determined file path may be "c:\program files\folderA\folderB." In other examples, the file path may also include the name of the executable file that is stored in the file path. The version and architecture information may be determined by calling one or more API functions. The determined information corresponding to the file, such as the file path, version, and architecture may be referred to as file identification information. The file identification information may include one or more of the file path, version, and architecture. In other examples, file identification information includes additional information, such as a hash code corresponding to the file.

At block 210, the file identification information is sent from the anti-malware application running on the client to a directory service application running on a server. The file identification information may be sent to the server in a tuple format. For example, the tuple may be a comma separated list of file identification information such as (file path, version, architecture). Other file identification information, such as the hash code of the file may additionally be sent to the server in the tuple or separately. In the present example, the server is a remote server that the client connects to over the Internet. In some examples, the server is associated with clients belonging to a particular local area network.

At block 212, the directory service performs a matching between the received file path and one or more file paths that are stored in a directory service registry on the server. The matching may be performed by first querying the directory service registry with the received file path to identify any matching file paths stored in the directory service registry. In the present example, the directory service registry includes one or more file identification entries, each entry having an associated file path. Each of the one or more file identification entries may correspond to a particular file. If the file path is determined to be a match with a stored file path entry of one of the file identification entries, processing continues at block 219.

At block 214, if there is no match between the received file path and the stored file paths associated with the one or more file identification entries, then the directory service requests the file from the client, where the file is the file that the client is attempting to install.

At block 216, the server receives the file from the client. The directory service application triggers an anti-malware scan of the file by one or more anti-malware scanner applications. An anti-malware scanner application may include, for example, commercial or proprietary anti-virus software. In the present example, each anti-malware scanner application returns a malware risk value associated with the received file. If there are more than one anti-malware scanners, the malware risk value determined by each scanner may be normalized and aggregated by the directory service. Malware risk value may be represented by a malware probability, a malware ratio or some other score or value representing the risk that the file includes malware.

At block 218, the directory service creates an entry for the file in the directory service registry. The entry is stored as a file identification information entry and may include one or more of the malware risk value corresponding to the file, the hash code corresponding to the file, the file counter that tracks the number of clients that have the file installed, and the file path corresponding to the file. Upon creating the entry, the file counter may default to "1." Upon detecting further installations of the file by other users, the directory service may increment the file counter to accurately reflect the number of clients who have the file. The directory service may also update the anti-malware scanner applications, such as by updating signature files of the anti-malware scanner applications, and periodically scan the file at a user-configured interval using the updated anti-malware scanner applications in order to update the malware risk value associated with the file.

Once the file a new file identification information entry has been created for the file, processing continues at block 220.

At block 219, the hash code, version, and architecture of the received file identification information is compared with the hash code, version, and architecture, respectively, of the file identification entries stored in the directory service registry. The comparing may be performed using a query of the directory service registry. A degree of match between one or more of the received hash code, version, and/or architecture information may be used to modify the risk score. In some examples, the processing continues at 220 if an exact match is detected between one or more of the hash code, version, and architecture information. In other examples, a partial match is sufficient. In yet other examples, a match is detected if there is an exact match with respect to all of the hash code, version, and architecture information. If a match is not detected, processing continues at block 214. Based on determining a match, the file counter in the matching entry in the registry is incremented.

At block 220, the hash code, file counter and malware risk value is retrieved from the file identification information entry in the directory service registry that is determined to be a match with the received file identification information. The file identification information entry that is a match may be referred to as a second file identification information entry. The data may be retrieved using a data search or other data lookup function. The data may be retrieved in a comma separated tuple format, such as: (hash code, file counter, malware risk value).

At block 222, the directory service determines a risk score from the data retrieved from the file identification information entry. In the present example, the risk score is modified by a file path score modifier as well. For example, the degree of match between the received file path and the stored file path may be represented by a file path score modifier, which is taken into account along with the file counter and malware risk value. The risk score may be determined using one or more functions. In the present example, the risk score is initialized at "0." The risk score is then modified by the file path score modifier, the file counter score modifier, and the malware risk score modifier in order to determine the risk score. The file counter score modifier and the malware risk score modifiers may be normalized values derived from the file counter and malware risk value retrieved from the file identification information entry. A normalized value may be determined by weighting the value, such as by multiplying or adding a constant to the value.

At block 224, data such as the risk score and the hash code associated with the file identification information entry is sent to the client. In some examples, the risk score and hash code are sent as a tuple. In other examples the risk score and hash code are sent separately. The hash code may be stored in a local data store on the client in order to use the hash code for future comparisons. For example, when a file is executed, the hash code of the file may be matched to the hash code in the local data store in order to determine that the file is allowed to execute. In other examples, the risk score may be sent to the client without sending the hash code to the client. For example, a client may use the hash code determined on the client rather than a hash code sent from the server. In other examples, additional information pertaining to the file may also be sent to the client. The information is received by the anti-malware application running on the client for processing.

At block 226, the anti-malware application presents the risk score on the client machine. In some examples, the risk score and user selection option is presented using a dialog that is displayed on a graphical user interface (GUI). In other examples, the risk score and user selection options may be presented via a command line interface.

At block 228, a user may review the risk score and select an option to continue with the file installation, or the user may select an option to abort the file installation. For example, the risk score may indicate to the user that there is a high probability of malware, and therefore the user may elect to cancel the file installation.

In other examples, the risk score and the selection may be presented to the user if the risk score exceeds a threshold, but not if the risk score does not exceed the threshold. For example, if the risk score does not exceed the threshold, then the file may automatically install without presenting the risk score and/or requesting additional user selections.

Figure 3:
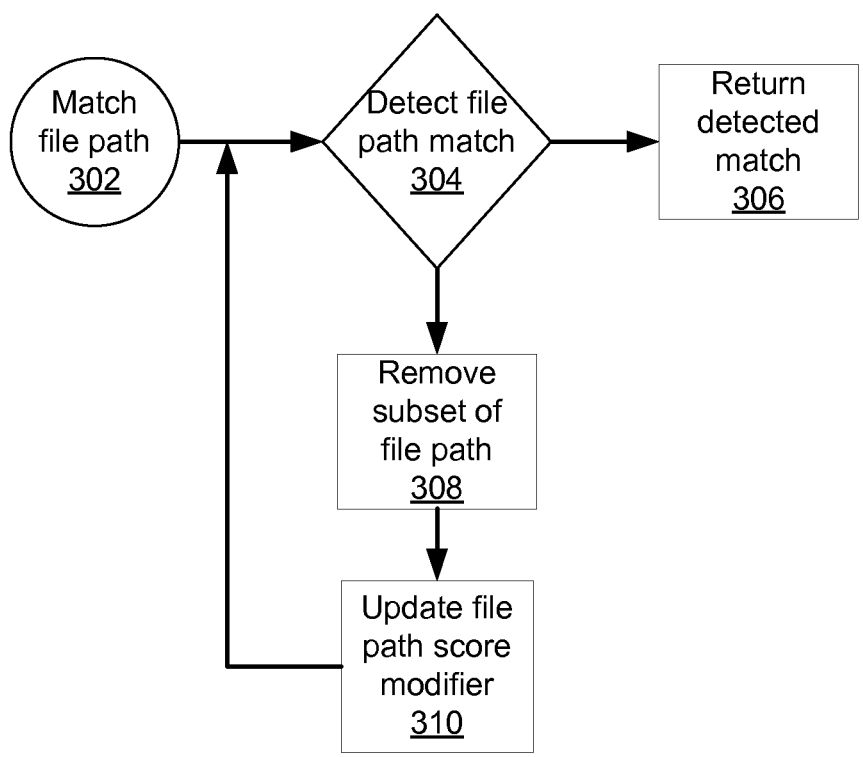
FIG. 3 is a flow diagram illustrating file path matching, according to an example of the present disclosure.

FIG. 3 is a flow diagram illustrating file path matching, according to an example of the present disclosure. The method 300 may be performed by processing logic that may comprise hardware (e.g., circuitry, dedicated logic, programmable logic and microcode), software (such as instructions run on a computer system, specialized hardware, dedicated machine, or processing device), firmware, or a combination thereof.

At block 302, the file path received from the client is processed by a directory service on a server. In the present example, the file path is input into a matching function to identify a match, and if a match is detected, a degree of match.

At block 304, the received file path is matched with stored file paths associated with one or more file identification information entries that are stored in a directory service registry. In some examples, the matching may include a brute-force character by character matching with each of the stored file paths. In other examples, the matching may include performing one or more other string matching algorithms for performing exact or fuzzy string matching.

At block 306, if a match is detected between the received file path and a stored file path, the file identification information entry associated with the detected match is returned to the directory service. For example, the received file path may be "c:\program files\folderA\folderB" and a file identification information entry in the directory service registry may have a stored file path that exactly matches the received file path. Accordingly, the file identification information entry with the matching file path is returned to the directory service.

At block 308, if no match between the received file path and the stored file paths is detected, then a portion of the received file path may be removed from the received file path. In some examples, the portion of the received file path is removed from the beginning of the received file path. For example, if the received file path is "c:\program files\folderA\folderB" then the received file path may be modified to "program files\folderA\folderB" by removing the "c:\" sub-string from the beginning of the received file path. The size of the portion to remove may be based upon detecting delimiters in the received file path, such as the "\" character. For example, removal of a first portion may remove the portion up to a first delimiter character. In another example, removal of a first portion may remove the portion up to and including a first delimiter character. In other examples, portions of a stored file path may be similarly removed.

At block 310, a file path score modifier is adjusted. In the present example, a file path score modifier is initialized at "0" and incremented for each portion of the file path that is removed. In some examples, when the first portion of the file path is removed, the file path score modifier is incremented to "1." In other examples, instead of incrementing the file path score modifier, the file path score modifier may be adjusted by another operation, such as by decrementing the file path score modifier.

After adjusting the file path score modifier and received file path, the received file path is compared with the stored file paths at block 304. If there is a match, then at 306 the file identification information entry with the stored file path that matches the received file path is returned to the directory service.

If no match between the received file path and the stored file paths is detected, then at block 308 a portion of the received file path is removed. For example, if the received file path is "program files\folderA\folderB," then the received file path is modified to "folderA\folderB" by removing the "program files\" sub-string from the beginning of the received file path.

At block 310, the file path score modifier is further adjusted based on the additional removal of another portion of the file path. For example, if the file path score modifier is at "1," then at block 310 the file path score modifier may be incremented to "2." In some examples, the file path score modifier is equal to the number of sub-strings removed.

Upon adjusting the file path score modifier, the method returns to block 304, and the method continues until either there is a match found or there is no portion of the received file path left to be removed. If there is a match found, then the file identification information entry associated with the detected match is returned to the directory service along with the file path score modifier. If there is no portion of the received file path left to be removed, then at block 306 the directory service identifies that there is no match between the received file path and any of the stored file paths.

Figure 4:
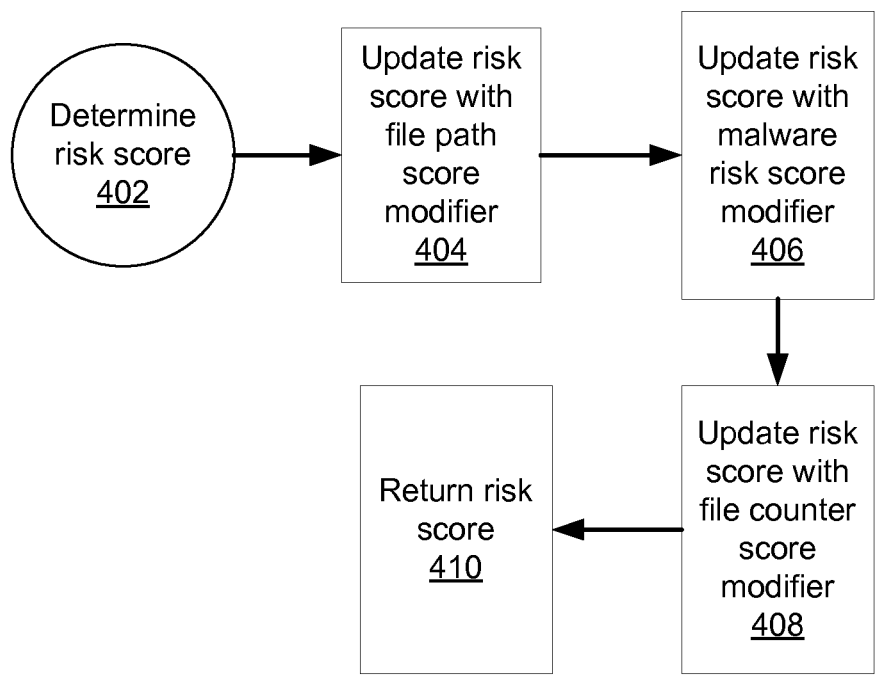
FIG. 4 is a flow diagram illustrating score determination, in accordance with various examples of the present disclosure.

FIG. 4 is a flow diagram illustrating score determination, according to an example of the present disclosure. The method 400 may be performed by processing logic that may comprise hardware (e.g., circuitry, dedicated logic, programmable logic and microcode), software (such as instructions run on a computer system, specialized hardware, dedicated machine, or processing device), firmware, or a combination thereof.

At block 402, the directory service begins the method to determine a risk score associated with file that the user is attempting to install. The method may be performed by inputting data such as a file path score modifier, malware risk score modifier, and file counter score modifier into a function.

At block 404, the risk score is modified by the file path score modifier. For example, if there were two portions of the file path removed in order to match with the stored file path, then the file path score modifier may be "2." The file path score modifier may be further adjusted using a constant value, such as by multiplying the file path score modifier by a constant in order to normalize the file path score modifier. In some examples, the risk score is initialized to "0." Therefore, the adding of the file path score modifier to the risk score may be an adding of the file path score modifier to "0."

At block 406, the risk score is modified using the malware risk score modifier. The malware risk is retrieved from the file identification information entry that has a file path that is determined to be a match with the received file path. In some examples, the malware risk may be normalized by multiplying the malware risk by a constant value to determine a malware risk score modifier. In some examples, the malware risk score modifier modifies the risk score by adding the malware risk score modifier to the risk score.

At block 408, the risk score is modified using the file counter score modifier. The file counter is retrieved from the file identification information entry that has a file path that is determined to be a match with the received file path. In some examples, the file counter is normalized by multiplying the file counter by a constant value to determine a file counter score modifier. In some examples, the file counter score modifier modifies the risk score by, for example, multiplying the file counter score modifier by the risk score.

In some examples, a formula for determining a risk score using the file path score modifier, the malware risk score modifier and the file counter score modifier may be as follows:

Risk score=(A*(file path score modifier)+B*(malware risk score modifier))*(C*file counter score modifier), where A, B, C are constants used to normalize the values.

At block 410, the risk score is returned to the directory service, where the risk score is then sent to the client.

Figure 5:
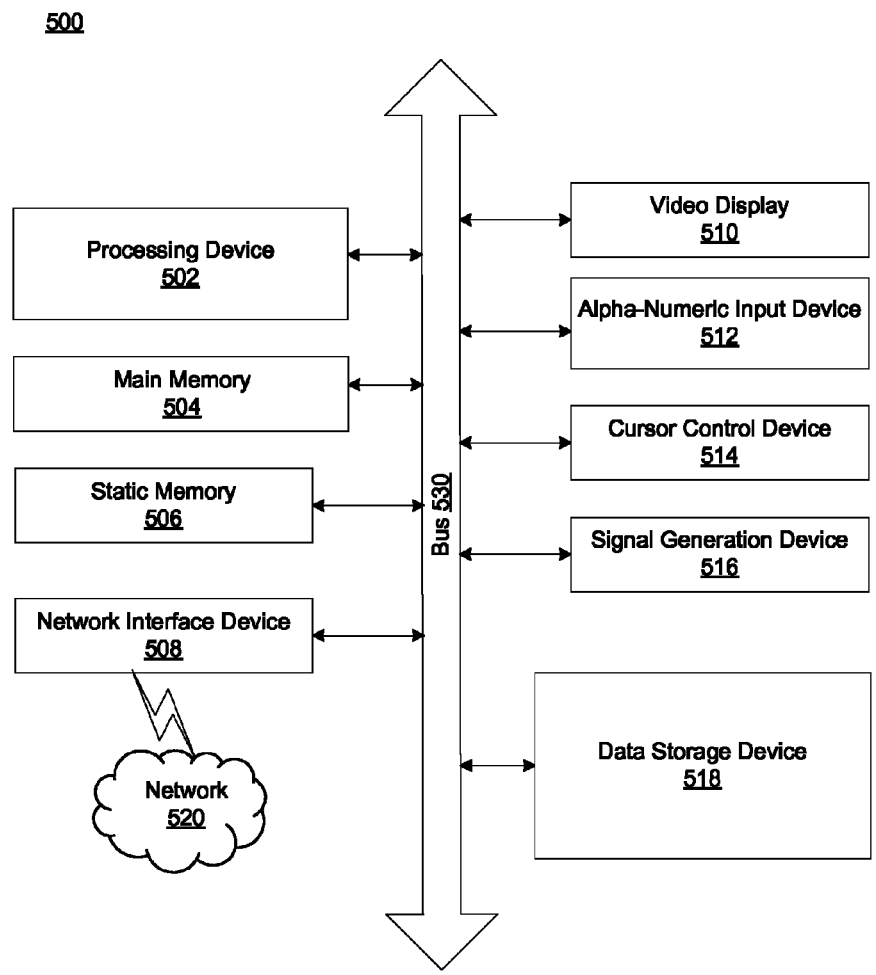
FIG. 5 is a block diagram illustrating an exemplary computer system that may perform one or more of the operations described herein.

FIG. 5 illustrates a diagram of a machine in the exemplary form of a computer system 500 within which a set of instructions, for causing the machine to perform any one or more of the methodologies discussed herein, may be executed. In other examples, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

Exemplary computer system 500 includes processing device (processor) 502, main memory 504 (e.g., read-only memory (ROM), flash memory, dynamic random access memory (DRAM) such as synchronous DRAM (SDRAM), double data rate (DDR SDRAM), or DRAM (RDRAM), and so forth), static memory 506 (e.g., flash memory, static random access memory (SRAM), and so forth), and data storage device 518, which communicate with each other via bus 530.

Processor 502 represents one or more general-purpose processing devices such as a microprocessor, central processing unit, or the like.

More particularly, processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute instructions for performing the operations and steps discussed herein.

Computer system 500 may further include network interface device 508.

Computer system 500 also may include video display unit 510 (e.g., a liquid crystal display (LCD) or a cathode ray tube (CRT)), alphanumeric input device 512 (e.g., a keyboard), cursor control device 514 (e.g., a mouse), and signal generation device 516 (e.g., a speaker).

Data storage device 518 may include a computer-readable storage medium on which is stored one or more sets of instructions (e.g., software) embodying any one or more of the methodologies or functions described herein. The instructions may also reside, completely or at least partially, within main memory 504 and/or within processor 502 during execution thereof by computer system 500, main memory 504 and processor 502 also constituting computer-readable storage media. The instructions may further be transmitted or received over network 520 via network interface device 508.

While data storage device 518 is shown in an example to be a single medium, the term "data storage device" should be taken to include a single medium or multiple media (e.g., a centralized or distributed database, and/or associated caches and servers) that store the one or more sets of instructions.

The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining," "measuring," "generating," "setting," "performing," "computing," "comparing," "applying," "creating," "ranking," "classifying," and the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A registry system comprising:
a client including at least one processor in communication with a memory, the client to:
    detect an operation corresponding to a first file; and
    determine a first identification information associated with the first file, the first identification information including a first hash code, a first file path, a first version, and a first architecture;
a server communicatively coupled to the client, the server having a directory service and a registry, the directory service to:
    receive the first identification information from the client;
    match between the first file path and a second file path that is associated with a second identification information, the matching including removing an amount of sub-strings from the first file path and adjusting a file path score based on the amount of sub-strings removed;
    after the matching, compare the first identification information with the second identification information, the second identification information including one or more of a hash code, a version, or an architecture;
    determine a risk value corresponding to the first file by aggregating the file path score, a file counter corresponding to the second identification information, and a malware risk value corresponding to the second identification information;
    notify the client of the risk value, prior to the client installing the first file;
the directory service further to:
    receive a third identification information;
    compare the third identification information and the second identification information;
    determine that the third identification information and the second identification information do not match;
    request a third file corresponding to the third identification information;
    receive the third file;
    scan the third file with a malware detector to determining a malware risk value corresponding to the third file; and
    update the registry with the third identification information and the malware risk value corresponding to the third file.

2. The registry system of claim 1, the client further to:
retrieve a second hash code from the directory service;
detect an attempted operation corresponding to the third file;
hash the third file to determine a third hash code; and
compare the second hash code and the third hash code.

3. The registry system of claim 1, the matching further comprising:
parsing the first file path, wherein the parsing comprises removing the sub-strings from the first file path until the first file path matches at least a portion of the second file path, wherein the sub-strings are determined based on a delimiter; and
incrementing the file path score to count the amount of sub-strings removed from the first file path.

4. The registry system of claim 1, the client further to:
based on the risk value exceeding a threshold, present an option on the client to cancel the operation corresponding to the first file.

5. The registry system of claim 1, wherein the malware risk value is determined based on a scan by a plurality of malware detectors of a file corresponding to the second identification information.

6. The registry system of claim 1, wherein aggregating the file path score, the file counter, and a malware risk value includes:
normalizing the file path score, the file counter, and the malware risk value to obtain a normalized file path score, a normalized file counter, and a normalized malware risk value.

7. A computer-implemented method performed by a server having a directory service and a registry comprising:
receiving a first identification information associated with a first file, the first identification information including a first hash code, a first file path, a first version, and a first architecture, wherein the first identification information is determined by a client;
matching between the first file path and a second file path that is associated with a second identification information, the matching including removing an amount of sub-strings from the first file path and adjusting a file path score based on the amount of sub-strings removed;
after the matching, comparing the first identification information with the second identification information, the second identification information including one or more of a hash code, a version, or an architecture;
determining a risk value corresponding to the first file by aggregating the file path score, a file counter corresponding to the second identification information, and a malware risk value corresponding to the second identification information;
notifying the client of the risk value, prior to the client installing the first file;
receiving a third identification information;
comparing the third identification information and the second identification information;
determining that the third identification information and the second identification information do not match;
requesting a third file corresponding to the third identification information;
receiving the third file;
scanning the third file with a malware detector to determining a malware risk value corresponding to the third file; and
updating a data store with the third identification information and the malware risk value corresponding to the third file.

8. The method of claim 7, further comprising:
retrieving a second hash code;
detecting an attempted operation corresponding to the third file;
hashing the third file to determine a third hash code; and comparing the second hash code and the third hash code.

9. The method of claim 7, the matching further comprising:
parsing the first file path, wherein the parsing comprises removing the sub-strings from the first file path until the first file path matches at least a portion of the second file path, wherein the sub-strings are determined based on a delimiter; and
incrementing the file path score to count the amount of sub-strings removed from the first file path.

10. The method of claim 7, further comprising:
based on the risk value exceeding a threshold, presenting an option on the client to cancel the operation corresponding to the first file.

11. The method of claim 7, wherein the malware risk value is determined based on a scan by a plurality of malware detectors of a file corresponding to the second identification information.

12. The method of claim 7, wherein aggregating the file path score, the file counter, and a malware risk value includes:
normalizing the file path score, the file counter, and the malware risk value to obtain a normalized file path score, a normalized file counter, and a normalized malware risk value.

13. A non-transitory computer-readable medium comprising computer-readable instructions, the computer-readable instructions executable by one or more processors of a server having a directory service and a registry to perform operations comprising:
receiving a first identification information associated with a first file, the first identification information including a first hash code, a first file path, a first version, and a first architecture, wherein the first identification information is determined by a client;
matching between the first file path and a second file path that is associated with a second identification information, the matching including removing an amount of sub-strings from the first file path and adjusting a file path score based on the amount of sub-strings removed;
after the matching, comparing the first identification information with the second identification information, the second identification information including one or more of a hash code, a version, or an architecture;
determining a risk value corresponding to the first file by aggregating the file path score, a file counter corresponding to the second identification information, and a malware risk value corresponding to the second identification information;
notifying the client of the risk value, prior to the client installing the first file;
receiving a third identification information;
comparing the third identification information and the second identification information;
determining that the third identification information and the second identification information do not match;
requesting a third file corresponding to the third identification information;
receiving the third file;
scanning the third file with a malware detector to determining a malware risk value corresponding to the third file; and
updating a data store with the third identification information and the malware risk value corresponding to the third file.

14. The non-transitory computer-readable medium of claim 13, the operations further comprising:
retrieving a second hash code;
detecting an attempted operation corresponding to the third file;

hashing the third file to determine a third hash code; and
comparing the second hash code and the third hash code.

15. The non-transitory computer-readable medium of claim 13, the matching further comprising:
parsing the first file path, wherein the parsing comprises removing the sub-strings from the first file path until the first file path matches at least a portion of the second file path, wherein the sub-strings are determined based on a delimiter; and
incrementing the file path score to count the amount of sub-strings removed from the first file path.

16. The non-transitory computer-readable medium of claim 13, wherein the malware risk value is determined based on a scan by a plurality of malware detectors of a file corresponding to the second identification information.

17. The non-transitory computer-readable medium of claim 13, wherein aggregating the file path score, the file counter, and a malware risk value includes:
normalizing the file path score, the file counter, and the malware risk value to obtain a normalized file path score, a normalized file counter, and a normalized malware risk value.

\* \* \* \* \*